(12) United States Patent
Jain et al.

(10) Patent No.: US 8,848,854 B2
(45) Date of Patent: Sep. 30, 2014

(54) ALTERNATE FEEDWATER INJECTION SYSTEM TO MITIGATE THE EFFECTS OF AIRCRAFT IMPACT ON A NUCLEAR POWER PLANT

(75) Inventors: Nirmal Jain, Windsor, CT (US); James R. Nowell, Waterford, CT (US); Subhash Chandra, West Hardford, CT (US); Edward E. Berry, Old Lyme, CT (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 542 days.

(21) Appl. No.: 12/889,500

(22) Filed: Sep. 24, 2010

(65) Prior Publication Data
US 2012/0076255 A1   Mar. 29, 2012

(51) Int. Cl.
*G21C 9/00* (2006.01)
*G21D 3/04* (2006.01)
*G21D 1/02* (2006.01)
*G21C 15/18* (2006.01)

(52) U.S. Cl.
CPC .. *G21C 9/00* (2013.01); *G21D 3/04* (2013.01); *Y02E 30/40* (2013.01); *G21D 1/02* (2013.01); *G21C 15/182* (2013.01)
USPC .......................................... 376/282; 376/283

(58) Field of Classification Search
USPC .................................................. 376/282, 283
See application file for complete search history.

(56) References Cited

U.S. PATENT DOCUMENTS

| | | | | |
|---|---|---|---|---|
| 4,473,528 | A * | 9/1984 | Kleimola | 376/282 |
| 4,595,555 | A * | 6/1986 | Orii | 376/283 |
| 4,644,780 | A * | 2/1987 | Jeter | 73/40.5 R |
| 5,108,695 | A * | 4/1992 | Schulz | 376/298 |
| 5,553,106 | A * | 9/1996 | Enomoto et al. | 376/305 |
| 2005/0135538 | A1 * | 6/2005 | Aoki et al. | 376/260 |
| 2010/0005738 | A1 * | 1/2010 | Guirgis | 52/202 |

* cited by examiner

*Primary Examiner* — Timothy A Brainard
(74) *Attorney, Agent, or Firm* — Richard J. Coldren; Westinghouse Electric Company LLC

(57) ABSTRACT

The present invention relates to an alternate feedwater injection system to at least partially mitigate the effects of an aircraft impact on a light water nuclear reactor positioned in a reactor building. The light water nuclear reactor has a primary system and a reactor core. The alternate feedwater injection system includes a water storage tank, an injection point into the primary system, a pump capable to transfer water from the water storage tank to the injection point and ultimately to the reactor core. The water storage tank and pump are located external to a reactor building and outside of an identified aircraft impact area or inside the identified aircraft impact area and provided with a means of protection from the aircraft impact.

7 Claims, 3 Drawing Sheets

ALTERNATE FEEDWATER INJECTION SYSTEM TO MITIGATE THE EFFECTS OF AIRCRAFT IMPACT ON A NUCLEAR POWER PLANT

FIELD OF THE INVENTION

The present invention relates to a dedicated alternate injection system to mitigate the effects of a single aircraft impact on a nuclear power plant, such as but not limited to a boiling water reactor plant or a pressurized water reactor plant.

DESCRIPTION OF THE RELATED ART

Based on proposed and/or amended regulations from the Nuclear Regulatory Commission (NRC), it is desirable and/or required for nuclear power plants to have the ability to withstand the impact of a large, commercial aircraft on the plant. Nuclear power plants can include light water reactors, such as, boiling water reactors and pressurized water reactors.

FIG. 1 is a sectional view of a boiling water nuclear reactor pressure vessel 10 with parts cut away to expose the interior thereof. The reactor pressure vessel 10 has a generally cylindrical shape and is closed at one end by a bottom head 12 and at its other end by a removable top head 14. A sidewall 16 extends from the bottom head 12 to the top head 14. A cylindrically shaped core shroud 20 surrounds a reactor core 22. The shroud 20 is supported at one end by a shroud support 24 and includes a removable shroud head 26 at the other end. An annulus 28 is formed between the shroud 20 and the sidewall of the vessel 16.

Heat is generated within the core 22, which includes fuel bundles 36 of fissionable material. Water circulated up through the core 22 is at least partially converted to steam. Steam separators 38 separate steam from water, which is re-circulated. Residual water is removed from the steam by steam dryers 40. The steam exits the reactor pressure vessel 10 through a steam outlet 42 near the vessel top head 14 and is commonly used to drive a turbine generator for the production of electricity.

The fuel bundles 36 are aligned by a lower core plate 50 located at the base of the core 22. A top guide 52 aligns the fuel bundles 36 as they are lowered into the core 22. Core plate 50 and top guide 52 are supported by the core shroud 20.

The amount of heat generated in the core 22 is regulated by inserting and withdrawing control blades 44 of neutron absorbing material in a cruciform shape for BWRs (and cylindrical rods for PWRs). The control rod guide tubes 46 below the lower core plate 50, align the vertical motion of the control blades 44 during insertion and withdrawal. Hydraulic control rod drives 48, which extend through the bottom head 12, effect the insertion and withdrawal of the control blades 44.

The reactor pressure vessel 10 is housed in a containment building (not shown). The containment building is constructed of several feet thick reinforced concrete and steel liner. This containment building is referred to as the primary containment. The primary containment itself is housed in a reinforced concrete structure, referred to as the secondary containment or the reactor building. The reactor building houses safety systems needed to mitigate an accident in the reactor pressure vessel.

A potential means of compliance with the proposed and/or amended NRC regulations is to design and build all safety-related structures with walls and other openings which are strong enough to withstand the impact of an aircraft. Various analyses have shown that to withstand an aircraft impact, the walls would need to be several feet thicker than the existing design. The existing safety-related structures in a nuclear power plant include the secondary containment (e.g., the reactor building), the control building (e.g., the main control room) and structures that contain the safety grade water systems, such as but not limited to the service water system (e.g., service water building). Modifying these existing safety-related structures, or building new safety-related structures, to withstand an aircraft impact would be very costly. Thus, there is a need and desire to provide a means of mitigating the effects of a single commercial aircraft impact on a nuclear power plant, which is cost effective.

The present invention provides a cost-effective means of mitigating the effects of a single commercial aircraft impact on a nuclear power plant which can be utilized with the current design of the safety-related systems and structures, and requires minimal or no modification to these existing systems and structures.

SUMMARY OF THE INVENTION

In an aspect, the present invention provides an alternate feedwater injection system to at least partially mitigate the effects of an aircraft impact on a light water nuclear reactor. The light water nuclear reactor is positioned in a reactor building. The light water nuclear reactor includes a reactor core and a primary system. The alternate feedwater injection system includes a water storage tank, an injection point into the primary system, and a pump capable to transfer water from the water storage tank to the injection point and ultimately to the reactor core. The water storage tank, pump and injection point are located external to the reactor building and are outside of an identified aircraft impact area or are inside the identified aircraft impact area and provided with a means of protection from the aircraft impact.

In another aspect, the present invention provides a suppression pool venting system for a nuclear power plant. The suppression pool venting system is located in a primary containment. The suppression pool venting system includes a primary vent system and an alternate secondary vent system. Each of the primary and secondary vent systems includes a vent path from the suppression pool to atmosphere. Each of the vent paths includes a rupture disc. The rupture disc automatically ruptures at a predetermined set point to vent the primary containment when the primary containment pressure reaches the predetermined set point.

BRIEF DESCRIPTION OF THE DRAWINGS

A further understanding of the invention can be gained from the following description of the preferred embodiment when read in conjunction with the accompanying drawings in which.

DETAILED DESCRIPTION OF THE PREFERRED EMBODIMENTS OF THE INVENTION

Figure 1:
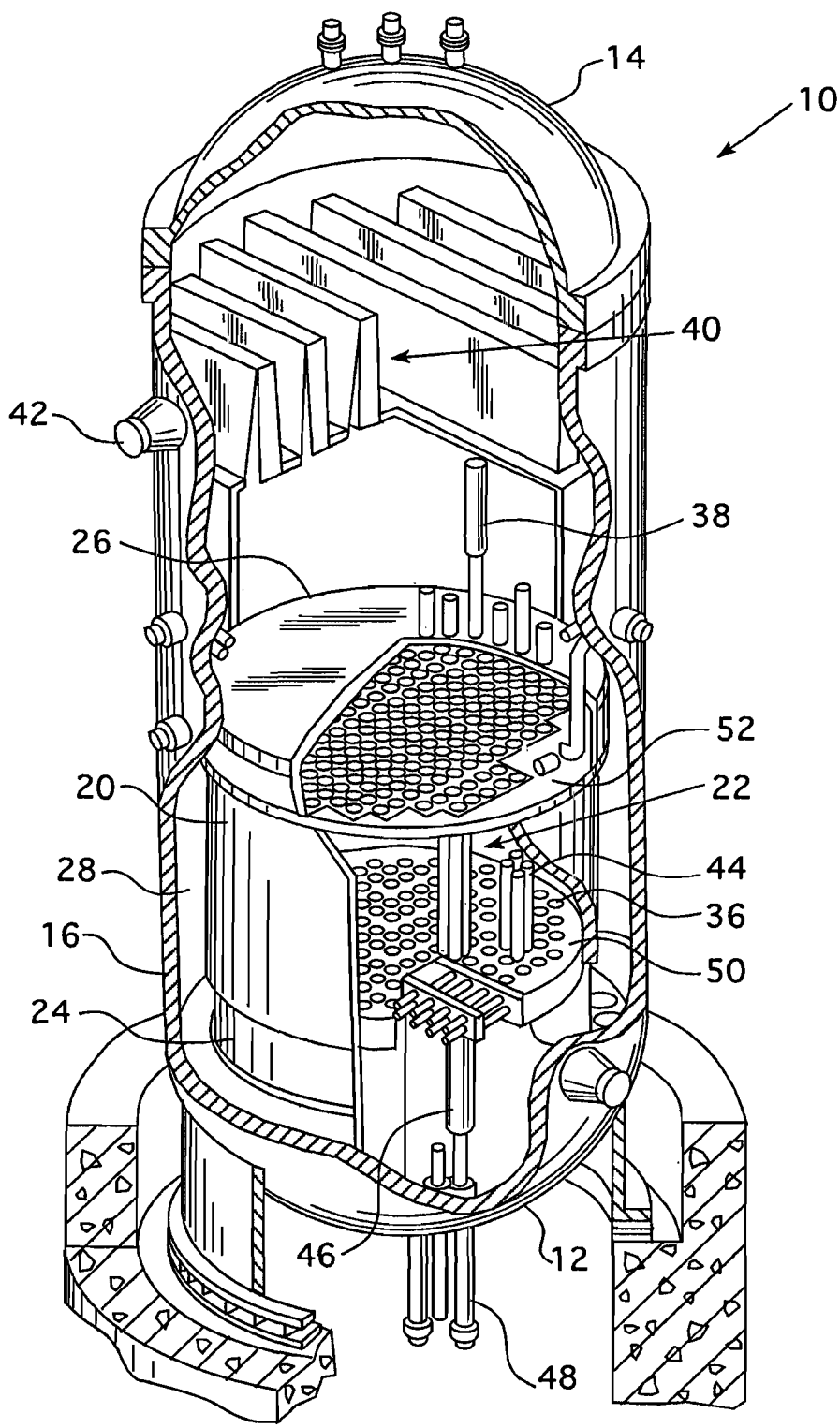
FIG. 1 is a sectional view, with parts cut away, of a boiling water nuclear reactor pressure vessel.

The present invention relates to an alternate feedwater injection system (AFIS) for use in a nuclear power plant. The AFIS of the present invention is operable to mitigate the effects resulting from a single commercial aircraft impact on a nuclear power plant. In such an event, the AFIS is capable to provide cooling flow to the fuel in the nuclear reactor. The AFIS is suitable for use in a variety of nuclear reactor designs. In particular, the AFIS of the present invention can be employed in light water reactors. Thus, the AFIS of the present invention can be employed in boiling water reactors (BWRs) and advanced boiling water reactors (ABWRs), and with appropriate modifications can be utilized in pressurized water reactors (PWRs) and advanced pressurized water reactors (APWRs). For ease of description, the present invention will be disclosed herein in reference to an ABWR.

The AFIS is positioned in a location external to the exiting safety-related structures and outside an identified aircraft impact area. As previously indicated, safety-related structures in a nuclear power plant include secondary containment (e.g., the reactor building), control building (e.g., main control room) and safety-grade water system structures (e.g., the service water building). The reactor building houses safety systems for operation of the nuclear reactor. The main control room houses the instrumentation and controls to monitor and control operation of the nuclear reactor. The service water structure houses the cooling water circulated from an ultimate hat sink used in cooling support components.

The AFIS can be located in an underground structure, such as, a bunker, or it can be in an above-ground structure. The AFIS includes piping, valves, at least one pump and a water source to supply the pump. The at least one pump, valves and associated piping can be located in a pump house. The at least one pump is operable to deliver water from the AFIS to the primary system, and ultimately to the reactor core of the nuclear power plant. The location of the AFIS is at a sufficient distance from the reactor building such that a simultaneous impact on the existing reactor building and the pump house of the AFIS is precluded. Further, the water and power sources for the AFIS pump are also located a sufficient distance from the reactor building such that a simultaneous impact on the existing reactor building and the water and power sources are precluded. The water source can be any type of container that is sized to store an adequate amount of water supply for the AFIS pump(s). In one embodiment, the water source is a demineralized water storage tank. The tank is connected to the pump by inlet piping and the pump is connected to the reactor of the nuclear power plant by discharge piping. The piping can be positioned underground or can be positioned above-ground with sufficient means of protection from the aircraft impact. The size and material of the piping can vary. In one embodiment, the piping is approximately 6 inches in diameter and is constructed of carbon steel.

The injection point of the AFIS positioned at various locations in the primary system. In one embodiment, the injection point is located in the feedwater piping. Various conventional means known in the art can be used to protect the injection point from physical, fire and shock damage which could result from the aircraft impact. Water from the water source is provided to the AFIS pump and the AFIS pump is capable of injecting water into the primary system at the reactor operating pressure and with sufficient flow rate to allow the nuclear fuel in the reactor core to remain covered by water and to preclude the fuel from overheating.

When the AFIS is not in use, the existing containment isolation valves in the nuclear power plant are typically sufficient to provide isolation of the AFIS. In one embodiment, check valve(s) and/or motor-operated valve(s) may be included in the AFIS piping, for example, upstream of the injection point, to isolate the AFIS when not employed. These valves are either positioned outside the predetermined/identified impact and fire zones or a protection means is employed to protect them from the aircraft impact.

In an ABWR, following reactor scram, steam is generated in the reactor core due to decay heat, and the steam is discharged through existing safety relief valves (SRVs) to a suppression pool. In one embodiment, the SRV can be modified to include a normally de-energized solenoid with DC power supply from the pump house. Further, for nitrogen supply to the valve, a connection point outside the reactor building is provided to allow for use of a portable nitrogen bottle. With the addition of the DC power and nitrogen supply, the SRV can be maintained in the open position, to allow a depressurization of the reactor below the operating pressure.

The discharge of steam to the suppression pool causes the temperature of the suppression pool to increase. The suppression pool is positioned in the primary containment and therefore, the decay heat is retained in the primary containment and the pressure in the primary containment will gradually increase. The primary containment pressure can be relieved by a vent system. For example, an existing rupture disc will open to discharge steam to the atmosphere to automatically relieve the pressure when the containment pressure reaches a pre-determined pressure set point. Typically, the vent system will relieve the pressure in about 24 hours after the aircraft impact. The vent path typically includes at least one isolation valve to allow termination of the steam discharge to the atmosphere, if so desired.

In one embodiment, it is contemplated that the existing suppression pool vent system may be damaged by the aircraft impact and therefore, venting of the suppression pool may be restricted or precluded. In accordance with the present invention, in an embodiment wherein capability of the existing primary suppression pool vent system is restricted or precluded, an alternate secondary vent system is added for venting capability. The alternate vent system includes vent piping which is routed above-ground a sufficient distance from the installed vent system such that both vent systems would not be within the effected zone of the aircraft impact. To assure that the alternate vent system is used as a secondary vent system or as a back-up, the rupture disc set point for the alternate vent system can be at a higher pressure than the set point of the existing (e.g., primary) vent path rupture disc.

Offsite radioactivity release as a result of venting is expected to be minimal. There is no expectation of fuel damage and short-lived activity is anticipated to decay in the suppression pool and the water in the suppression pool will provide scrubbing.

A limited set of instrumentation is protected from the aircraft impact area which provides indication in the pump room to allow implementation of the operator actions in the event of an aircraft impact. In one embodiment, indication is also provided in the control room. These instruments are:
  a reactor pressure vessel water level;
  a reactor pressure vessel pressure;
  suppression pool pressure; and
  suppression pool water level.

The instrumentation is located in the reactor building, but protected from the impact of the aircraft strike by being placed in a room which is structured to be protected from fire, shock or physical damage resulting from the aircraft impact. The power supply to the instrumentation is provided from the pump house by cables routed underground. If any portion is located above ground, it includes a protection means to protect it from fire.

In the event of an aircraft impact, the operator initiates the AFIS from the pump house such that the AFIS delivers water to the injection point of the primary system to ultimately cool the nuclear fuel in the reactor core. In one embodiment, at least thirty minutes are available for the operator to initiate the injection flow. In this embodiment, it is contemplated that there would be at least limited advance warning of the approaching aircraft to allow operator actions, such as, reactor scram and dispatching of personnel to the pump house. In another embodiment, if the control of the AFIS is available in the control room, the injection flow is initiated from the control room.

The pump house, pump, piping and valves, instrumentation, and alternate vent system are not required to be safety grade. The seismic design or safety classification of these structures and systems is to ensure that the addition of these structures and systems do not degrade the design of the existing safety or seismically designed systems. The power source to the pump house can be non-1E and the water source to the pump house can be non-safety.

A common pump house can serve a nuclear plant site having multiple reactor units, provided that the effected zone of the aircraft impact does not include more than one reactor to the extent that multiple reactors need to rely on the AFIS to provide cooling flow.

In one embodiment, an AFIS is designed to mitigate the following damage that may result from aircraft impact of a nuclear power plant:
  loss of all safety division cabling in the reactor building as a result of fire;
  loss of all instrumentation to the control room as a result of fire;
  loss of control room due to fire and shock;
  degradation of the ultimate heat sink (UHS) capacity due to physical and fire damage;
  loss of all 1E and non-1E power distribution due to fire spreading simultaneously in the reactor building and the turbine building; and
  inaccessibility of reactor and control buildings to execute post impact recovery actions due to physical damage and fire/extreme temperatures.

Figure 2:
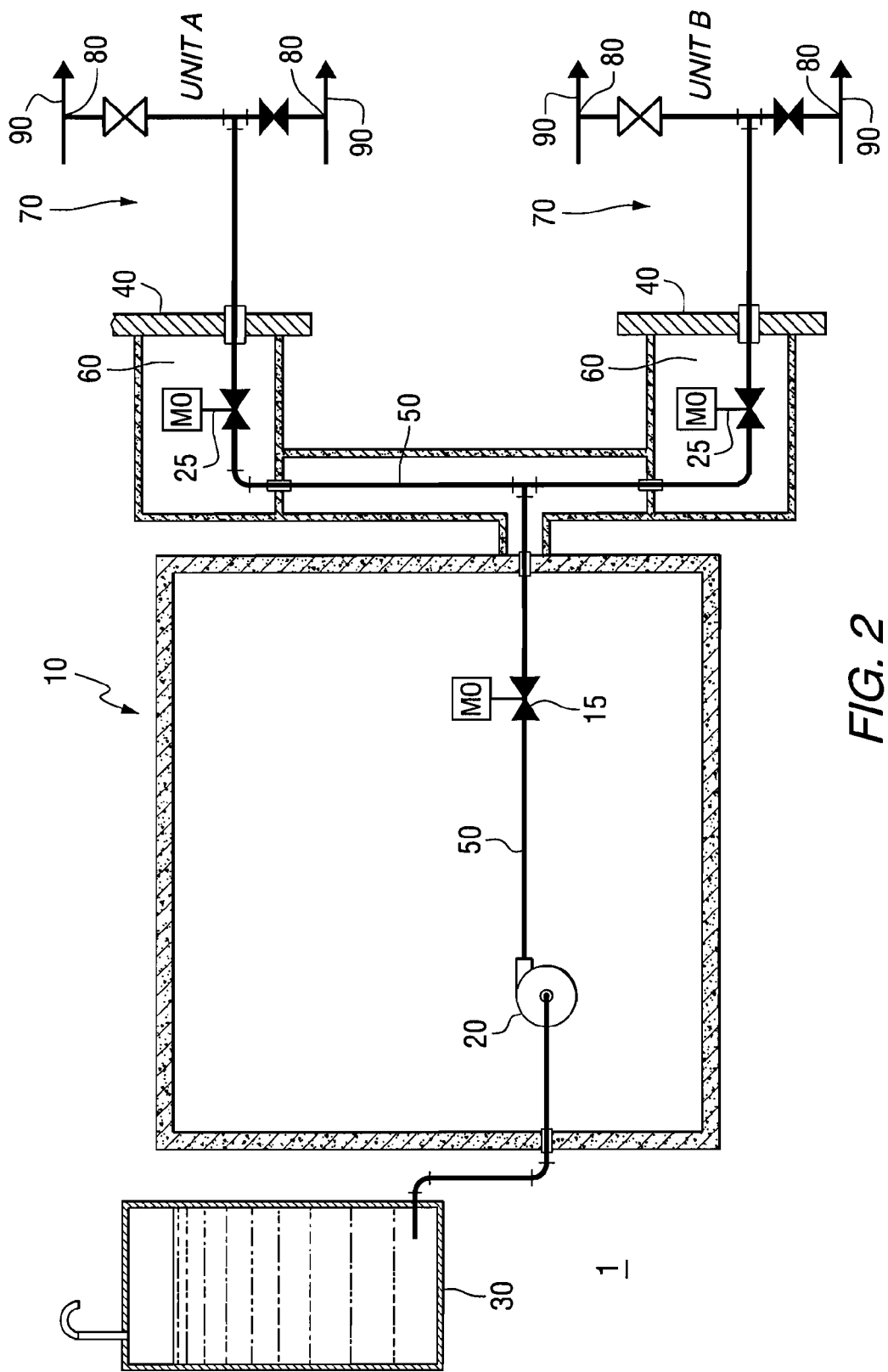
FIG. 2 is a schematic diagram of an alternate feedwater injection system in accordance with an embodiment of the present invention.

FIG. 2 shows an alternate feedwater injection system 1 that is designed in accordance with an embodiment of the present invention to mitigate the damage from the impact of a single aircraft. In this embodiment, as shown in FIG. 2, the pump house 10 of the AFIS 1 is an above-ground structure housing a pump 20. The water source 30 for the pump 20 is a demineralized water tank which is located near the pump house 10. The pump house 10 and the water tank 30 are positioned such as to preclude simultaneous impact of the pump house 10 and the water tank 30, and the reactor building 40. In one embodiment, the pump house 10 and the water tank 30 are located behind an ultimate heat sink basin (not shown). Piping 50, from the discharge of pump 20, is routed through the reactor service water tunnel 60 to the reactor building 40 for each of a Unit A and a Unit B at a multiple-unit nuclear power plant site. Above ground, the piping 50 is routed in the steam tunnel 70 and the injection point 80 is provided through the feedwater line 90 for injection into the reactor vessel (not shown).

Further, as shown in FIG. 2, a first motor-operated valve 15 is positioned in the piping 50 downstream of the pump 20 discharge, in the pump house 10. A second motor-operated valve 25 is positioned in the piping 50 located in the reactor service water tunnel 60 to control flow to the reactor. In one embodiment, the second valve 25 is located in the pump room. The power source for the pump 20 and the motor operated valves 15,25 is provided by a non-safety power supply (not shown) which is expected to remain available following the aircraft impact. A similar power supply (not shown) is provided for a second nuclear unit and can be employed as the backup power supply for the impacted nuclear unit. The preferred power supply is from the Unit A gas turbine generator bus with the back-up power supply from the Unit B gas turbine generator bus. A means can be provided for manually switching power from the one power supply to the back-up power supply.

The pump 20 can be started locally from the pump house 10. In an embodiment, the pump can also be remotely started from the control room (not shown). In a further embodiment, it is contemplated that injection of water from the AFIS can be initiated within thirty minutes of an aircraft impact to prevent fuel uncovery in the reactor core (not shown).

Figure 3:
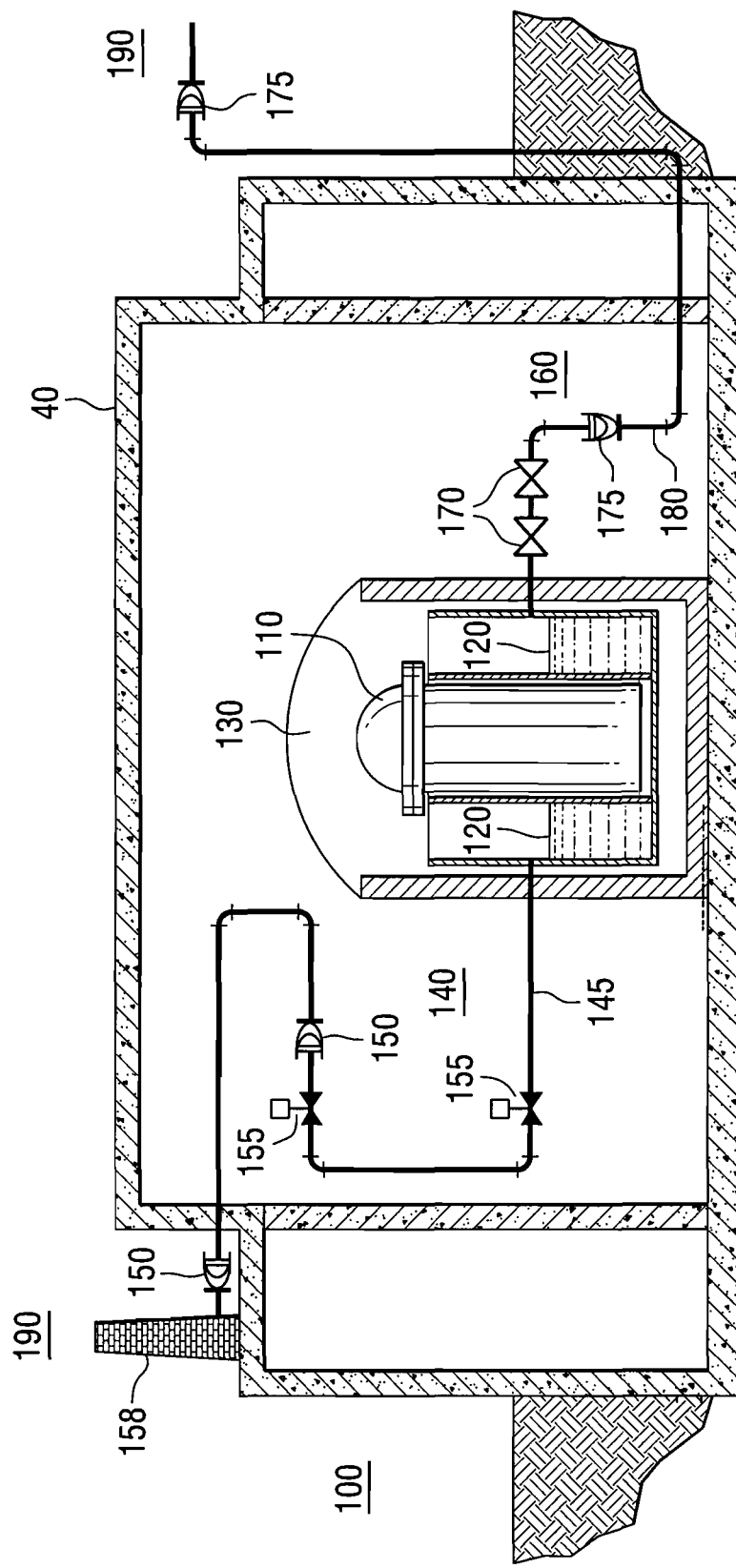
FIG. 3 is a schematic diagram of a suppression pool vent system in accordance with an embodiment of the present invention.

FIG. 3 shows a suppression pool venting system (SPVS) 100 in accordance with an embodiment of the present invention. The SPVS 100 is positioned in the reactor building 40. The reactor pressure vessel 110 and the suppression pool 120 are located in the primary containment 130. The primary containment 130 is located in the reactor building 40. The SPVS 100 includes an existing vent system 140 having a vent path 145 and rupture discs 150 positioned therein. One of the rupture discs 150, which is located in close proximity to the stack 158, is used to prevent debris from entering the vent path 145. The rupture discs 150 automatically fail when the pressure of the suppression pool 120 reaches a predetermined set point and the pressure of the primary containment 130 is relieved by venting steam to the stack 158 and into the atmosphere 190. The one of the rupture discs, which is located in close proximity to the stack 158, fails (i.e., blows) at a very low pressure. In addition, the existing vent path 145 includes valves 155 which are normally left open and can be utilized to terminate the vent flow to the stack 158, as desired. In addition to this existing vent system 140, the SPVS 100 also includes an alternate vent system 160. The alternate vent system 160 includes valves 170 and rupture discs 175 positioned in the alternate vent piping 180. The valves 170 are normally left open and can be utilized to terminate the vent flow, as desired. The alternate vent system 160 is capable of depressurizing the suppression pool 120 located in the primary containment 130 by discharging steam through the vent piping 180 and into the atmosphere 190. Since the alternate vent system 160 is used as a secondary vent system or as a back-up, the rupture disc set point for the rupture disc 175 may be at a higher pressure than the rupture disc set point for the rupture disc 150 in the existing (e.g., primary) vent system 140.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the breath of the appended claims and any and all equivalents thereof.

The invention claimed is:

1. An alternate feedwater injection system to at least partially mitigate the effects of an aircraft impact on a light water nuclear reactor positioned in a reactor building, the light water nuclear reactor having a reactor core and a primary system, the alternate feedwater injection system, comprising:
  a water storage tank located external to and separate from the reactor building, and outside an identified aircraft impact area for protection from the aircraft impact;
  an injection point located in feedwater piping;
  a pump to transfer water from the water storage tank to the injection point and ultimately to the reactor core, the pump located external to the reactor building and housed in an independent structure separate from the reactor building for protection from the aircraft impact;

inlet piping to connect the water storage tank to the pump, the inlet piping positioned in an above ground structure or in an underground structure for protection from the aircraft impact; and discharge piping to connect the pump to the reactor core, the discharge piping positioned in an above ground structure or in an underground structure for protection from the aircraft impact.

2. The system of claim 1, wherein the pump transfers water to the injection point at an operating pressure of the reactor core.

3. The system of claim 1, wherein, the pump transfers water at a sufficient flow rate such that nuclear fuel in the reactor core remains substantially covered by water.

4. The system of claim 1 wherein, the pump is located in a structure positioned above ground.

5. The system of claim 1 wherein, the pump is located in a structure positioned underground.

6. The system of claim 1 wherein, the discharge piping conduit is located in an underground bunker.

7. The system of claim 1, wherein, the nuclear reactor is selected from a boiling water reactor and a pressurized water reactor.

* * * * *